United States Patent
Prendergast et al.

(10) Patent No.: US 11,797,179 B1
(45) Date of Patent: Oct. 24, 2023

(54) ACCUMULATED DATA TRANSFER AMOUNT ACCESS

(71) Applicant: The Toronto-Dominion Bank, Toronto (CA)

(72) Inventors: Jonathan Joseph Prendergast, West Chester, PA (US); Christopher Mark Jones, Villanova, PA (US); Thomas Osman Kelly, Wenonah, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/744,072

(22) Filed: May 13, 2022

(51) Int. Cl.
G06F 3/06 (2006.01)
(52) U.S. Cl.
CPC ............ G06F 3/0605 (2013.01); G06F 3/067 (2013.01); G06F 3/0646 (2013.01); G06F 3/0659 (2013.01)
(58) Field of Classification Search
CPC .... G06F 3/0605; G06F 3/0646; G06F 3/0659; G06F 3/067
See application file for complete search history.

(56) References Cited

U.S. PATENT DOCUMENTS

| 8,751,338 | B2 | 6/2014 | Dombroski et al. |
| 10,339,608 | B1 | 7/2019 | Haitz et al. |
| 2002/0007417 | A1* | 1/2002 | Taylor .............. H04N 21/23116 725/87 |
| 2009/0150555 | A1* | 6/2009 | Kim ...................... G06F 3/0638 709/231 |
| 2016/0026981 | A1 | 1/2016 | Collins et al. |
| 2020/0097916 | A1 | 3/2020 | Hackert et al. |
| 2020/0380614 | A1 | 12/2020 | Zubenko et al. |

OTHER PUBLICATIONS

Bhide, Manish, et al. "Adaptive push-pull: Disseminating dynamic web data." IEEE Transactions on Computers 51.6 (2002): 652-668. (Year: 2002).*
Legion: "Legion Instantpay"; https://legion.co/products/legion-instantpay/; Feb. 2, 2022.
Porter: "Here's when an early withdrawal from a CD is worth it"; published in Bankrate; 'https://www.bankrate.com/banking/cds/cd-early-withdrawal-can-come-at-a-high-price/; Jan. 6, 2021.
Even: "The leading platform for on-demand pay + more"; https://www.even.com/platform/product; Feb. 2, 2022.

* cited by examiner

Primary Examiner — Nicholas J Simonetti
(74) Attorney, Agent, or Firm — Rowand LLP

(57) ABSTRACT

Systems and methods of determining whether to initiate a pull of an accumulated data transfer amount are described. An accumulated data transfer amount for a periodic data transfer scheduled to be pushed at a future date is determined. A determination is made of whether an overall data amount in a storage location is expected to be greater at a date on or after the scheduled future date if a pull of the accumulated data transfer amount is performed before the scheduled future date than if a pull operation is not performed and the accumulated data transfer amount is sent at the scheduled future date. When the overall data amount in the storage location is expected to be greater at the scheduled future date if the pull of the accumulated data transfer amount is performed, a pull of the accumulated data transfer amount is initiated.

20 Claims, 5 Drawing Sheets

ACCUMULATED DATA TRANSFER AMOUNT ACCESS

TECHNICAL FIELD

The present application relates to data transfers and, more particularly, to determining whether to pull a data transfer amount prior to a scheduled push transfer date.

BACKGROUND

Two general methods exist for transferring data from one location to another location: push transfers and pull transfers. A push transfer is a method of transfer where the transferor instructs data to be sent to the transferee, and a pull transfer is a method of transfer where the transferee instructs data to be sent from the transferor.

Push transfers may often be scheduled to be executed at periodic intervals between a transferor and a transferee. For example, although changes to data files at a primary storage location may occur at many times during a given week, data file updates from the primary storage location to secondary storage locations may be scheduled to occur at weekly intervals.

While the periodic scheduling of push transfers may provide efficiency to the updating process, there may be times when it is disadvantageous for a transferee to wait until the schedule future date to receive certain data. For example, there is a risk that the scheduled future date may coincide with computer or network failure and that the scheduled transfer may therefore be postponed. There is also a more serious risk that data available at the present time may be inadvertently or deliberately deleted prior to the scheduled future date. At the same time, early transfer of data via a pull transfer may provide for a data processing yield that would be otherwise unobtainable.

A data transfer loss may be associated with a pull transfer. Even so, in view of the risks associated with waiting, it may still be advantageous for a transferee to initiate a pull transfer prior to a scheduled future date. Systems and methods for determining when it is advantageous to initiate a pull transfer are desired.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
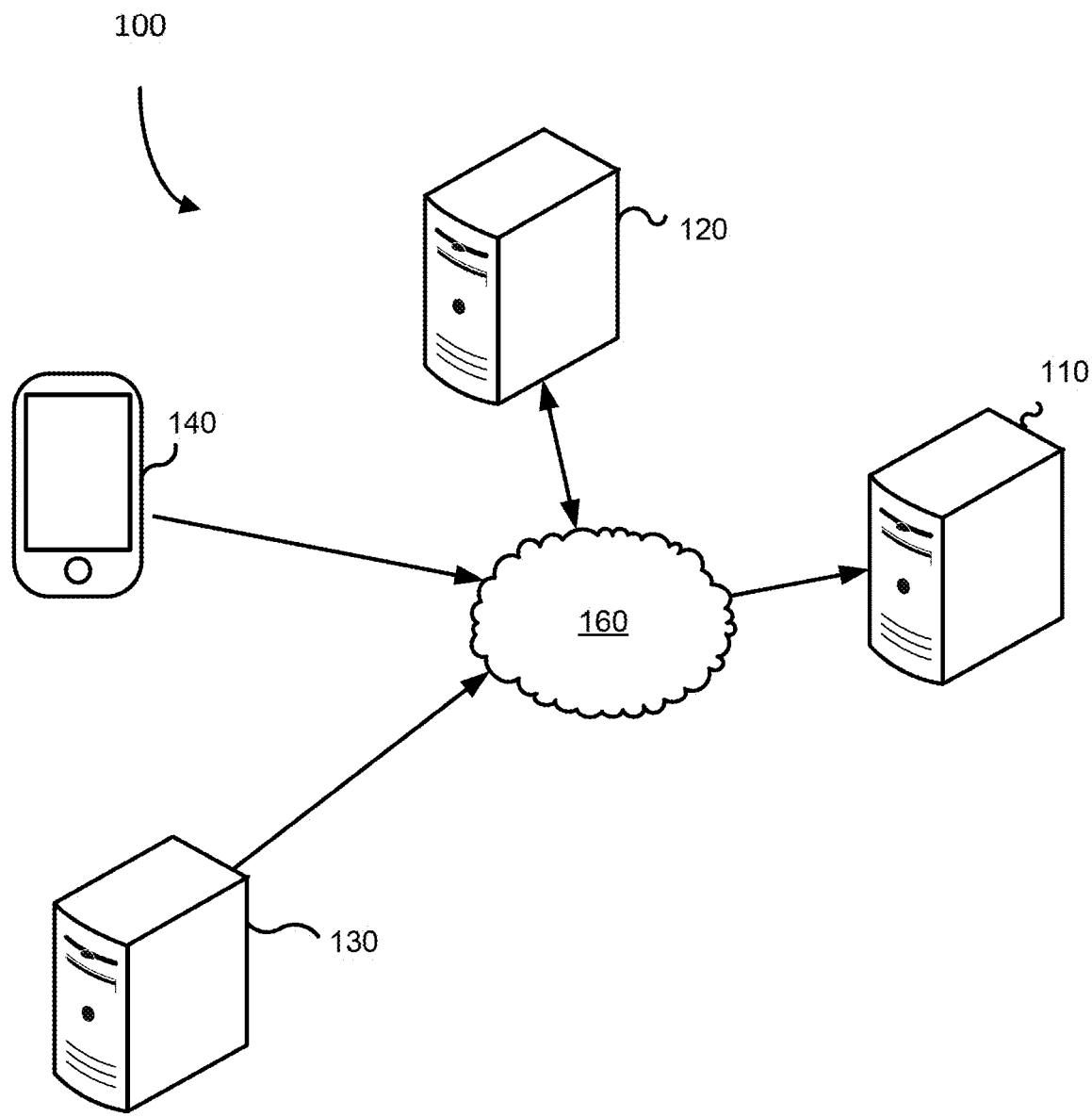
FIG. 1 is a schematic operation diagram illustrating an operating environment of an example embodiment.

According to the subject-matter of the present application, there may be provided a system comprising a communications module; a processor coupled to the communications module; and a memory coupled to the processor, the memory storing processor-executable instructions which, when executed, configure the processor to determine an accumulated data transfer amount for a periodic data transfer scheduled to be pushed at a future date; determine whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and when the overall data amount in the storage location is expected to be greater at the scheduled future date if the pull of the accumulated data transfer amount is performed, initiate a pull transfer of the accumulated data transfer amount.

In some implementations, the processor is further configured to prior to determining whether an overall data amount in a storage location is expected to be greater at a date on or after the scheduled future date, determine that the accumulated data transfer amount exceeds a threshold amount.

In some implementations, the determination of whether the overall data amount is expected to be greater considers one or more of a data transfer loss amount associated with the pull transfer; and a first data processing yield amount associated with the accumulated data transfer amount.

In some implementations, the first data processing yield amount is based on the accumulated data transfer amount and a time period between the initiation of the pull transfer of the accumulated data transfer amount and the scheduled future date.

In some implementations, determining that the overall data amount in a storage location is to be expected to be greater at a date on or after the scheduled future date includes determining that the first data processing yield amount is greater than the data transfer loss amount.

In some implementations, the determination of whether the overall data amount is expected to be greater further considers a data processing penalty amount, and wherein the data processing penalty amount is avoided if a pull transfer of the accumulated data transfer amount is performed before the scheduled future date.

In some implementations, an entity is associated with the accumulated data transfer amount, and the processor is further configured to prior to initiating a pull transfer of the accumulated data transfer amount, provide, to a client device associated with the entity, a notification; and receive, from the client device associated with the entity, instructions to initiate the pull transfer of the accumulated data transfer amount.

In some implementations, the determination of whether the overall data amount is expected to be greater at a date on or after the scheduled future date further considers a second data processing yield amount associated with the accumulated data transfer amount, and wherein the notification includes the first and second data processing yield amounts.

In some implementations, the notification includes a selectable option to initiate the pull transfer of the accumulated data transfer amount.

In some implementations, determining that the overall data amount in a storage location is to be expected to be greater at a date on or after the scheduled future date includes determining that the data processing penalty amount is greater than the data transfer loss amount.

In accordance with another aspect of the present application, there is provided a method comprising determining an accumulated data transfer amount for a periodic data transfer scheduled to be pushed at a future date; determining whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and when the overall data amount in the storage location is expected to be greater at the scheduled future date if the pull transfer of the accumulated data transfer amount is performed, initiating a pull transfer of the accumulated data transfer amount.

In some implementations, prior to determining whether an overall data amount in a storage location is expected to be greater at a date on or after the scheduled future date, determining that the accumulated data transfer amount exceeds a threshold amount.

In some implementations, determining whether the overall data amount is expected to be greater considers one or more of: a data transfer loss amount associated with the pull transfer; and a first data processing yield amount associated with the accumulated data transfer amount.

In some implementations, the first data processing yield amount is based on the accumulated data transfer amount and a time period between the initiation of the pull transfer of the accumulated data transfer amount and the scheduled future date.

In some implementations, determining that the overall data amount in a storage location is to be expected to be greater at a date on or after the scheduled future date includes determining that the first data processing yield amount is greater than the data transfer loss amount.

In some implementations, determining whether the overall data amount is expected to be greater further considers a data processing penalty amount, and wherein the data processing penalty amount is avoided if a pull transfer of the accumulated data transfer amount is performed before the scheduled future date.

In some implementations, an entity is associated with the accumulated data transfer amount, and the method further comprises prior to initiating a pull transfer of the accumulated data transfer amount, providing, to a client device associated with the entity, a notification; and receiving, from the client device associated with the entity, instructions to initiate the pull transfer of the accumulated data transfer amount.

In some implementations, the notification includes a selectable option to initiate the pull transfer of the accumulated data transfer amount.

In some implementations, determining that the overall data amount in a storage location is to be expected to be greater at a date on or after the scheduled future date includes determining that the data processing penalty amount is greater than the data transfer loss amount.

According to yet another aspect of the present application, there is provided a non-transitory computer-readable storage medium comprising processor-executable instructions which, when executed, configure a processor to determine an accumulated data transfer amount for a periodic data transfer scheduled to be pushed at a future date; determine whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and when the overall data amount in the storage location is expected to be greater at the scheduled future date if the pull transfer of the accumulated data transfer amount is performed, initiate a pull transfer of the accumulated data transfer amount.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Open Banking refers to the use of open APIs that enable third-party developers to build applications and services around a financial institution. In practice, most of the applications so developed relate to Fintech. Open Banking provides Fintech providers with access to customer data stored by one or more financial institutions, allowing for the creation of aggregation platforms to facilitate financial planning and advice, and services to help customers compare product features across financial institutions.

A financial institution may periodically update a Fintech provider at scheduled intervals. In some implementations, the periodic updates may comprise a periodic transfer of data from the financial institution to the Fintech provider, i.e., a periodic push transfer. In some embodiments, the financial institution may periodically transfer some or all of the relevant resources accumulated since the previous transfer to the Fintech provider. However, it may sometimes be advantageous for the Fintech provider to initiate a transfer of accumulated resources, i.e., a pull transfer, prior to a future scheduled date of periodic push transfer.

FIG. 1 is a schematic operation diagram illustrating an operating environment of an example embodiment.

As illustrated, the system 100 includes a first database management system 110, a second database management system 120, a third database management system 130, and a client device 140 in communication via a network 160.

Each of the first database management system 110, the client device 140, the second database management system 120, and the third database management system 130, may be in geographically disparate locations. Put differently, one or more of the first database management system 110, the client device 140, the second database management system 120, and the third database management system 130 may be remote to others of the first database management system 110, the client device 140, the second database management system 120, and the third database management system 130.

The first database management system 110, the client device 140, the second database management system 120, and the third database management system 130 are computer systems. Computer systems may be, for example, a mainframe computer, a minicomputer, or the like. Computer systems may include one or more computing devices. For example, a computer system may include multiple computing devices such as, for example, database servers, computer servers, and the like. The multiple computing devices may be in communication using a computer network.

For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The first, second, and third database management systems 110, 120, 130 may each be a single server, multiple servers, a server farm, or any other such arrangement of computing devices to implement computing server-like functionality. In some embodiments, the first, second and third database management systems 110, 120, 130 may track, manage, and maintain owned resources belonging to respective entities. The resources may be represented in a database. The secure storage(s) may be provided internally within the first, second, and third database management systems 110, 120, 130 or externally. The secure storage(s) may, for example, be provided remotely from the first, second, and third database management systems 110, 120, 130. For example, the secure storage(s) may include one or more data centers. The data centers may, for example, store data with bank-grade security.

The resources may, for example, be computer code, spreadsheet data, and/or database information and may include image, text, audio and/or video files. Additionally or alternatively, the resources may be computing resources, such as memory or processor cycles. Additionally or alternatively, the resources may be digital goods, such as digital media resources; fonts, logos, photos and graphics; digital subscriptions; online advertisements; internet coupons; electronic tickets; electronic documentation; downloadable software and/or mobile apps; cloud-based applications and online games; virtual goods used within the virtual economies of online games and communities; workbooks; worksheets; planners; e-learning (online courses); webinars, video tutorials; blog posts; cards; patterns; website themes; and/or templates. Examples of digital media resources include e-books, downloadable music, internet radio, internet television and/or streaming media. The resources may be a specific type of digital goods known as digital assets, and may include photography, logos, illustrations, animations, audiovisual media, presentations, spreadsheets, digital paintings, word documents, electronic mails, websites, and a multitude of other digital formats and their respective metadata. Digital assets may be subject to digital rights management (DRM) and/or digital asset management (DAM). By way of further example, the resources may be database resources, and may represent stored value, such as financial instruments, including fiat currency and cryptocurrency. In at least some implementations, the resources may be or include digital goods which are exchange mediums. For example, the digital goods may be or represent monetary instruments.

The first database management system 110 may include a quantity of exploitable resources. The exploitable resources may include computer code, spreadsheet data, and/or database information and may include image, text, audio and/or video files. Additionally or alternatively, the exploitable resources may include computing resources, such as memory or processor cycles. Additionally or alternatively, the exploitable resources may include digital goods.

In some embodiments, the first database management system 110 may include records for a plurality of exploitable resource accounts and at least some of the records may define a quantity of exploitable resources. A first entity may be associated with one or more accounts storing or otherwise reflecting owned resources, i.e., an owned resource account. The records may reflect a first quantity of stored resources that are associated with the first entity. Such resources may include owned resources. The amount of exploitable resources associated with the entity may be reflected by an exploitable resource definition defined in an associated exploitable resource record. The exploitable resource definition may be or include a balance defined in an associated record; for example a bank balance. In some implementations, the exploitable resource definition may define one or more digital goods and/or digital assets that are associated with the first entity.

In some embodiments, the first database management system 110 may, for example, be a computing client, such as a web client, an email client, an online chat client, and/or a video game client. In some embodiments, the first database management system 110 may, for example, be a fintech provider server and the first entity may be a customer of the respective fintech provider operating the associated financial provider server. Examples of fintech providers include Mint™ Tink™ and Plaid™. In some embodiments, the first database management system 110 may, for example, be an associated financial institution server and the first entity may be a customer of the respective financial institution operating the associated financial institution server.

The second database management system 120 may include a quantity of accumulated resources. The accumulated resources may include computer code, spreadsheet data, and/or database information and may include image, text, audio and/or video files. Additionally or alternatively, the accumulated resources may include computing resources, such as memory or processor cycles. Additionally or alternatively, the accumulated resources may include digital goods.

In some embodiments, the second database management system 120 may include records for a plurality of accumulated resource accounts and at least some of the records may define a quantity of accumulated resources. The first entity may be associated with one or more of the plurality of accumulated resource accounts, and the associated records may reflect a quantity of accumulated resources that are associated with the first entity. Such resources may include owned resources. The amount of accumulated resources associated with the first entity may be reflected by an accumulated resource definition defined in an associated accumulated resource record. The accumulated resource definition may be or include a balance; for example a bank balance and/or an earned wage balance.

In some embodiments, the second database management system 120 may, for example, be a computing server, such as a web server, an email server, an online chat server, and/or a video game server. In some embodiments, the second database management system 120 may, for example, be an associated financial institution server and the first entity may be a customer of the respective financial institution operating the associated financial institution server. In some embodiments, the second database management system 120 may be an Earned Wage Access (EWA) platform.

Earned wage access (EWA) is a financial service offered to employees providing access to some of their accrued wages before the end of their payroll cycle. EWA is also known as instant pay, earned income, early wage access, accrued wage access, salary advance scheme and/or on demand pay. Employees may use an application to transfer earned wages to their bank account, debit card, or payroll card. Typically, such a transfer requires payment of a fee.

In some embodiments, each of the accumulated resource accounts may be associated with one or more future dates. The one or more future dates associated with an accumulated resource account may represent one or more scheduled future dates for periodic data transfer. The periodic data transfer may be a push transfer from the second database management system 120 to another system, such as the first database management system 110.

In some embodiments, the amount of accumulated resources associated with an entity may accrue over time. The accrual of accumulated resources may occur at a predetermined rate and the predetermined rate may be known to the first entity. For example, the accumulated resource definition may reflect $100.00 on a current date, and the first entity may know that this amount will increase at a fixed rate, for example, by $50.00 per day.

The second database management system 120 may include an application programming interface (API) which allows other systems, such as, for example, the first database management system 110, to determine an accumulated data transfer amount for a periodic data transfer scheduled to be pushed at a future date. The API may also allow other systems, such as, for example, the first database management system 110, to initiate a data transfer, i.e., a pull transfer, from the second database management system 120 to the first database management system 110. The pull transfer may comprise some or all of the accumulated data transfer amount.

The second database management system 120 may periodically update the first database management system 110 at scheduled intervals. In some implementations, the periodic updates may comprise a periodic transfer of data from the second database management system 120 to the first database management system 110, i.e., a periodic push transfer. In some embodiments, the second database management system 120 may periodically transfer some or all of the accumulated resource definition from an accumulated resource record at the second database management system 120 to an associated exploitable resource record at the first database management system 110. In some embodiments, the accumulated resource record and the associated exploitable resource record may both be associated with the first entity. As a result of a periodic push transfer, in some implementations, the resource definition of the accumulated resource record may reflect a lower amount of resources or may become zero. As a further result of a periodic push transfer, in some implementations, the resource definition at the associated exploitable resource record may reflect the aggregate amount of the previous accumulated resource definition and the previous exploitable resource definition.

The periodic data transfer may occur at a variety of intervals. For example, the periodic data transfer may occur on a daily, weekly, biweekly, semimonthly, monthly, and/or bimonthly basis. Additionally or alternatively, the periodic data transfer may occur as a result of a resource definition reaching a certain amount. For example, in some embodiments, the periodic data transfer may occur once a certain amount of data has been accumulated. In some embodiments, the periodic data transfer may occur at such time as a resource definition reaches $100.00 or $500.00. Once a transfer occurs, the resource definition associated with the amount of accumulated resources may reflect a lower amount, and/or may revert to zero.

In some embodiments, a data transfer from the second database management system 120 to the first database management system 110 may be initiated by the first management system i.e., a pull transfer. There may be, however, a data transfer loss amount associated with a pull transfer. The data transfer loss amount may be known, or it may be unknown. The data transfer loss amount may be fixed and/or variable. For example, a pull transfer may result in a data transfer loss amount of, for example, $10.00, or of, for example, 2% of the total amount transferred. As another example, the data transfer loss amount associated with a pull transfer may be $10.00 plus 2% of the amount transferred.

In some embodiments, the first database management system 110 may collect information by tracking the amount and the periodicity of data transfers transfer from an accumulated resource record at the second database management system 120 to an associated exploitable resource record at the first database management system 110. The first database management system 110 may use the collected information to predict the amount and the date of the future push transfers from the accumulated resource record at the second database management system 120 to the associated exploitable resource record at the first database management system 110.

The first database management system 110 may also include records relating to risk associated with an insufficient amount of exploitable resources, and these records may be associated with the first entity. For example, it may be that the first database management system 110 includes records identifying various upcoming bills usually paid using some or all of the quantity of exploitable resources associated with the entity. These records may include the amount, due date and late fees associated with each of these upcoming bills. As a result, the first database management system 110 may determine that an upcoming bill will become due before the date of the next transfer, and may further determine that there is presently an insufficient amount of exploitable resources available to pay the bill. As a result, the first database management system 110 may determine that a data processing penalty amount, i.e., a late fee, may be applied in connection with the bill if it is paid after the due date. The first database management system 110 may likewise determine that the data processing penalty amount may be avoided if the bill is paid before on or before the due date.

The third database management system 130 may include records for a plurality of third resource accounts and at least some of the records may define a quantity of resources associated with an entity. The records may reflect a third quantity of stored resources that are associated with the entity. Such resources may include owned resources. The amount of third resources that are owned by the entity may be reflected by a third resource definition defined in an associated third resource record. The third resource definition may be or include a balance defined in the associated third resource record; for example a bank balance. In some implementations, the resource definition may define one or more digital goods and/or digital assets that are associated with the entity.

In some embodiments, the third database management system 130 may, for example, be a digital asset resource server and the respective entity may be a customer of a respective institution operating the digital asset resource server. In some embodiments, the third database management system 130 may, for example, be an associated financial institution server and the respective entity may be a customer of the respective financial institution operating the associated financial institution server. The associated financial institution may be, for example, a stock brokerage firm.

In some embodiments, the third quantity of stored resources may increase over time. As a reflection of this increase, the associated resource definition may increase as well. The reason for an increase in the third quantity of stored resources may vary. For example, it may be that the third management system is associated with a financial institution, and the third quantity of resources reflects an amount of resources invested in a financial instrument. The financial instrument may be, for example, a high-interest savings account, treasury bills, certificates of deposit, stocks, derivatives, or foreign exchange currency. The rate of increase over time may be certain, such as when the financial instrument is a high-interest savings account, or it may be unknown yet predictable, such as when the financial instrument is a stock.

The client device 140 is also a computing device. In some embodiments, the client device 140 may, as illustrated, be a personal computer such as a smart phone. However, the client device 140 may be a computing device of another type such as a laptop computer, a desktop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the client device 140 may be associated with one or more users. The one or more users may be associated with an entity, such as a user or client, having resources associated with the first database management system 110. In some implementations, a user may operate the client device 140 to cause the client device 140 to perform one or more operations consistent with the disclosed embodiments. In some embodiments, the client device 140 may include a smart card, chip card, integrated circuit card (ICC), and/or other card having an embedded integrated circuit.

Figure 2:
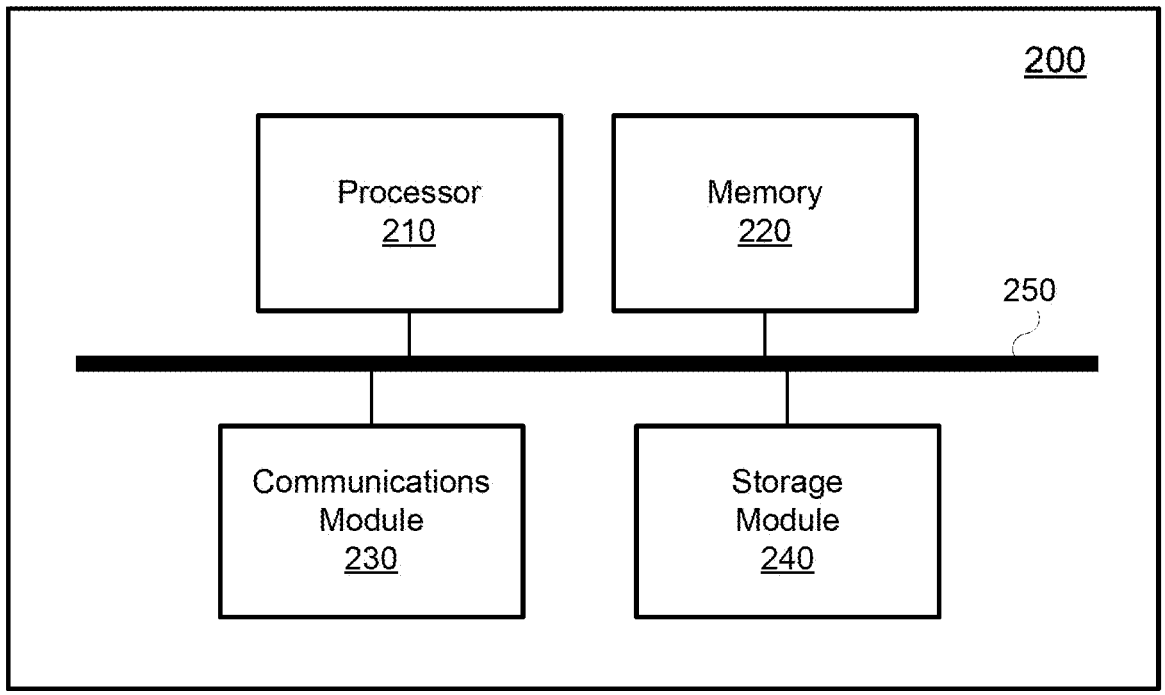
FIG. 2 is a high-level operation diagram of an example computing device.

Referring now to FIG. 2, a high-level operation diagram of an example computing device 200 will now be described. The example computing device 200 may be exemplary of the first database management system 110, the client device 140, the second database management system 120, and/or the third database management system 130.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The example computing device 200 will include other components apart from those illustrated in FIG. 2 and the specific component set may differ based on whether the example computing device 200 is operating as the first database management system, the client device, the second database management system, and/or the third database management system. For example, the example computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the example computing device 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
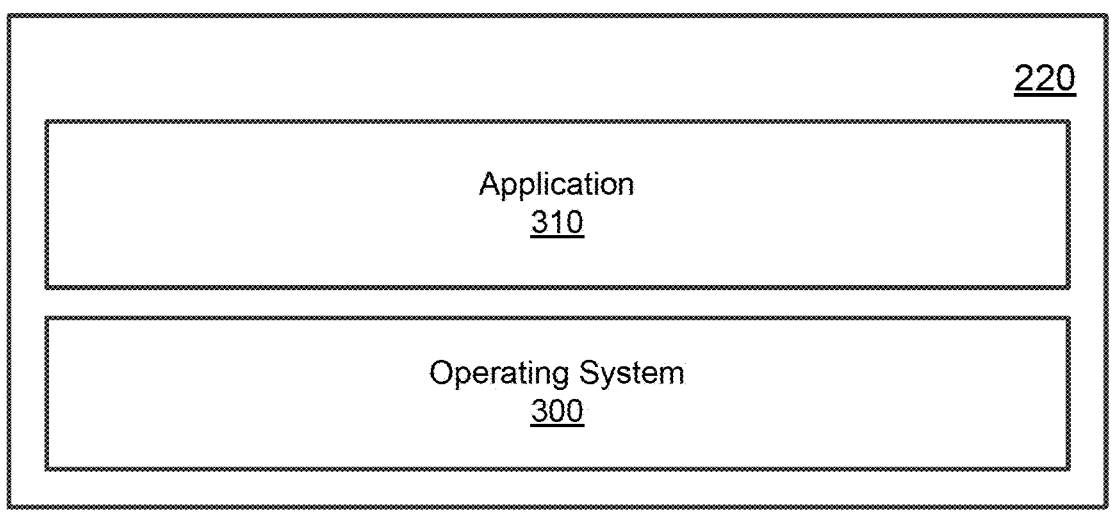
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™, Windows™, Apple™, Apple OSX™, Android™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the first database management system, the client device, the second database management system, and/or the third database management system.

Figure 4:
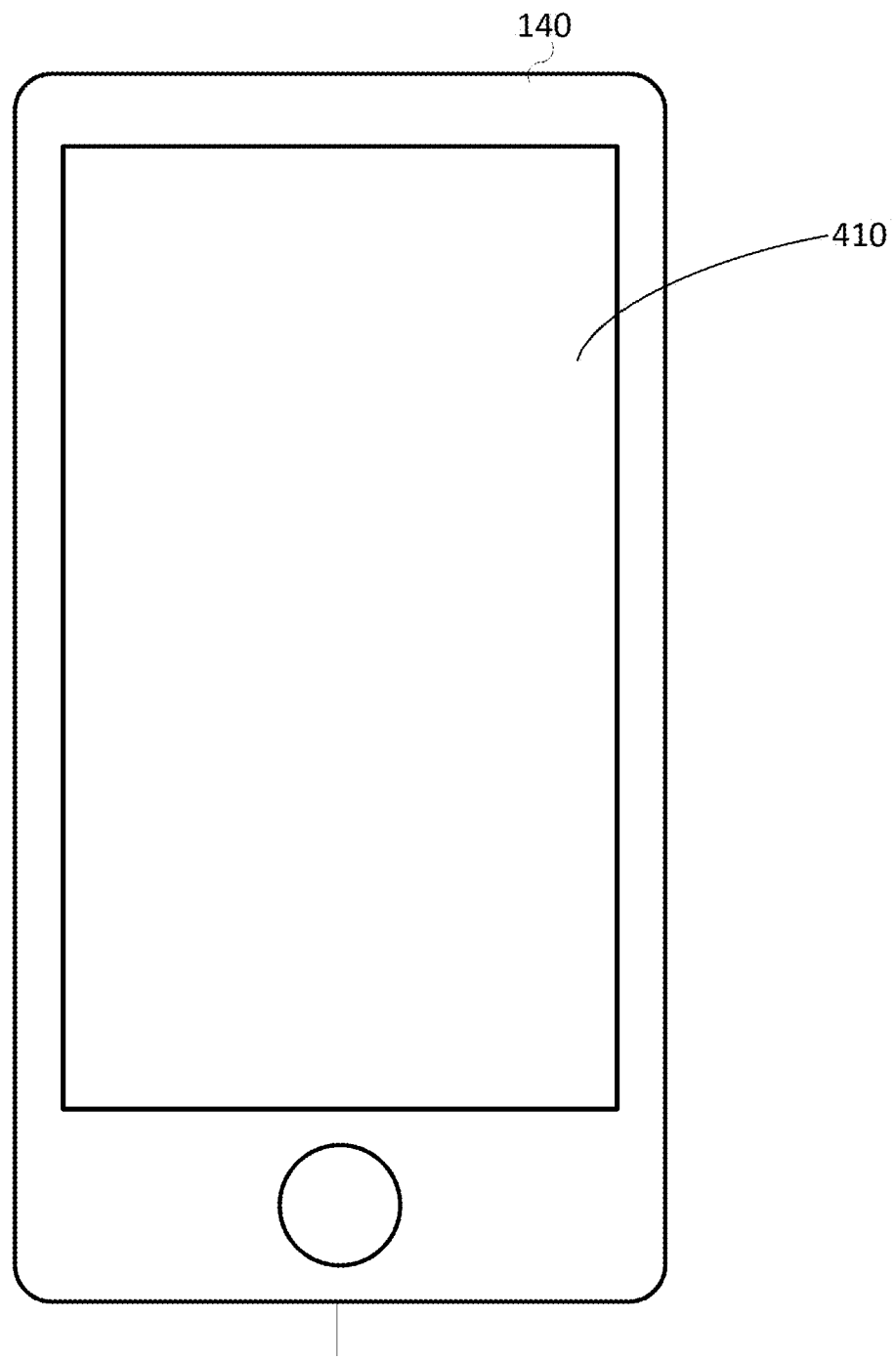
FIG. 4 is an example screen display of a client device.

FIG. 4 shows the front of the client device 140 of FIG. 1. The client device 140 may be a personal computing device, such as a smart phone, as shown in FIG. 4. As previously described, the client device 140 may be a computing device of another type such as a laptop computer, a desktop computer, a tablet computer, a notebook computer, a hand-held computer, a personal digital assistant, a portable navigation device, a mobile phone, a wearable computing device.

As illustrated, the front of the client device 140 includes a display 410. The display 410 is a module of the smart phone embodiment of the client device 140. The display 410 is for presenting graphics. The display 410 may be, for example, a liquid crystal display (LCD). In addition to being an output device, the display 410 may also be an input device. For example, the display 410 may allow touch input to be provided to the client device 140. In other words, the display 410 may be a touch sensitive display module. In a particular example, the display 410 may be a capacitive touch screen.

Figure 5:
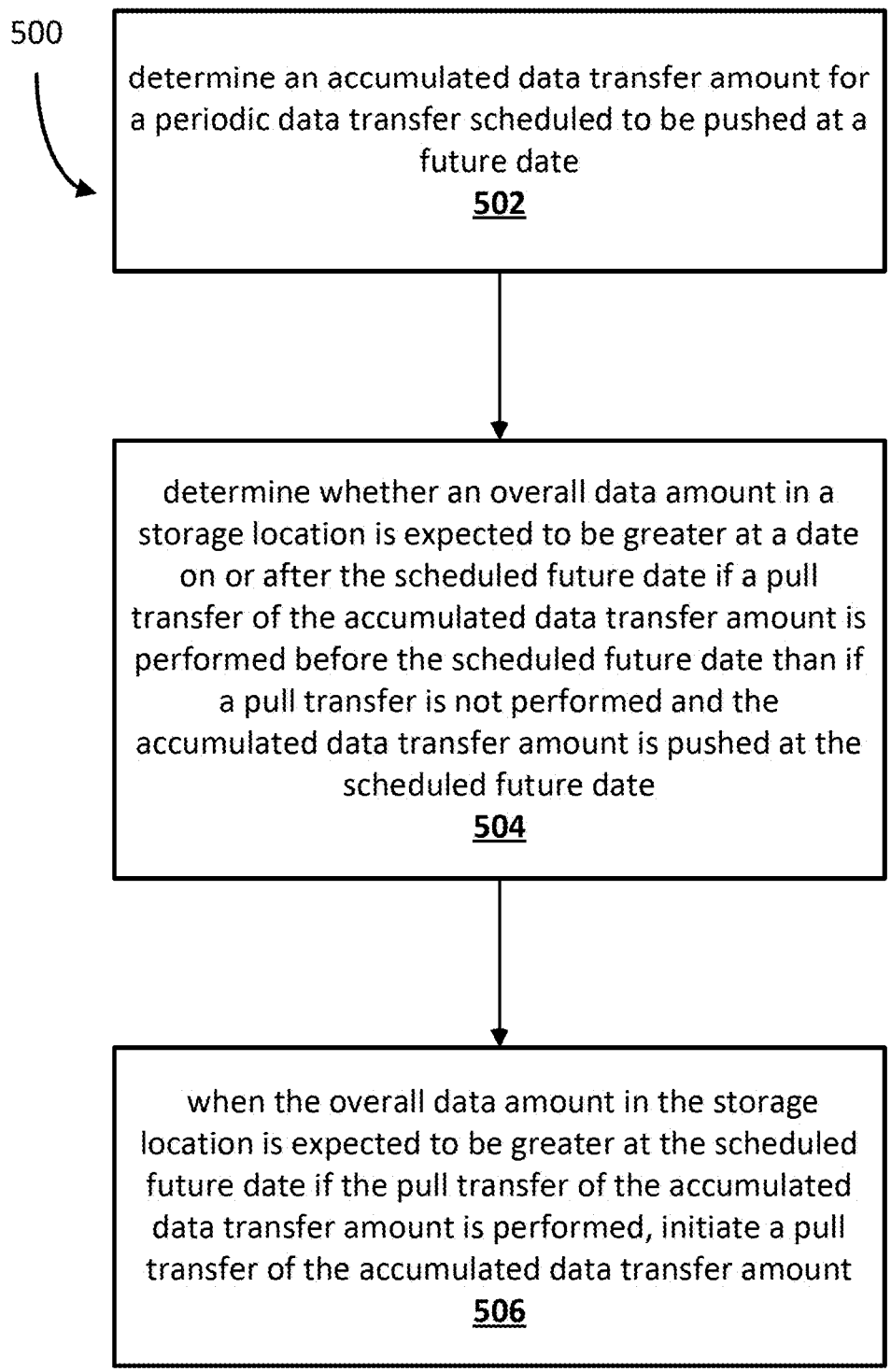
FIG. 5 is a flow chart showing operations performed by a system, in accordance with an embodiment of the present application.

The operation of the first database management system will now be described with reference to the flowchart of FIG. 5 which illustrates a method 500 for initiating a pull transfer of an accumulated data transfer amount. Operations 502 and onward are performed by one or more processors of a computing device, such as for example the processor 210 of a suitably configured instance of the example computing device 200, executing software such as, for example, a suitable instance of the application 310.

At the operation 502, the first database management system determines an accumulated data transfer amount for a periodic data transfer scheduled to be pushed at a future date. For example, the first management system may access one or more records of the second database management system to determine the accumulated data transfer amount and to determine the next scheduled date of a pull transfer. As noted, the accumulated data transfer amount may correspond to computer code, spreadsheet data, and/or database information and may include image, text, audio and/or video files. Additionally or alternatively, the accumulated resources may include computing resources, such as memory or processor cycles. Additionally or alternatively, the accumulated resources may include digital goods. In some embodiments, the accumulated data transfer amount may be reflected by an accumulated resource definition defined in an associated accumulated resource record, such as an earned wage balance.

In some embodiments, the first database management system determines that the accumulated data transfer amount exceeds a threshold amount. The threshold amount may be a fixed amount or may be a relative amount. For example, the threshold amount may be a dollar amount, such as $50 or $100, or the threshold amount may be a relative amount, such as one-quarter or one-third of the amount of the future scheduled transfer.

At the operation 504, the first database management system determines whether an overall data amount in a storage location is expected to be greater at a date on or after the scheduled future date if a pull of the accumulated data transfer amount is performed before the scheduled future date than if a pull transfer is not performed and the accumulated data transfer amount is pushed at the scheduled future date.

The determination of whether the overall data amount is expected to be greater may consider one or more of a data transfer loss amount associated with the pull transfer, and a first data processing yield amount associated with the accumulated data transfer amount. As previously noted, a data transfer loss amount may be associated with a pull transfer from the second database management system to the first database management system. In some embodiments, no such data transfer loss is associated with a scheduled push transfer at a scheduled future date. However, in some embodiments, early access to an accumulated data transfer amount may provide one or more opportunities for an overall data amount increase. The one or more opportunities for an overall data amount increase may not be available after the scheduled future date.

The overall data amount increase may result from a first data processing yield amount. For example, in some embodiments where the resources are computer code, spreadsheet data, and/or database information, the first database management system may determine that processing the accumulated transfer amount early may provide a first data processing yield amount that is greater than the data transfer loss amount. In some embodiments, the first database management system may determine that investing the accumulated data transfer amount before the scheduled future date will provide a first processing yield amount that is greater than the data transfer loss amount. As a result of determining that the first processing yield amount is greater than the data transfer loss amount, the first database management system may further determine that an overall data amount at a storage location is expected to be greater at a date on or after the scheduled future date if a pull of the accumulated data transfer amount is performed before the scheduled future date.

The storage location may be associated with the first entity and may comprise one or more subsidiary storage locations associated with the first entity. The one or more subsidiary storage locations may reside at the first database management system and/or the second database management system and/or the third database management system. The storage location may include one or more resource accounts including records defining one or more quantities of resources associated with the first entity. The records may reflect a quantities of stored resources that are associated with the first entity. Such resources may include owned resources.

In some embodiments, the first data processing yield amount may be based on the accumulated data transfer amount and the time period between the initiation of a pull transfer of the accumulated data transfer amount and the scheduled future date. For example, the first data processing yield amount associated with the accumulated data transfer amount may also be associated with an investment. As such, the first data processing yield amount may correspond to an amount projected to be earned by the scheduled future date through using the accumulated data transfer amount to acquire an investment. The first data processing yield amount may be calculated based on the accumulated data transfer amount, the time period until the scheduled future date, and a rate of return of the investment. The investment may be, for example, a high-interest savings account, treasury bills, certificates of deposit, stocks, derivatives, and/or foreign exchange currency. In some embodiments, the investment may reside on the first database management system or the third database management system.

In some embodiments, a data processing yield amount may be calculated for each of the remaining days until the scheduled future date. In this way, a plurality of data processing yield amounts associated with an investment may be calculated corresponding to a plurality of pull transfer initiation dates.

For example, if today is April 1 and the scheduled future date is April 5, a plurality of data processing yield amounts may be calculated corresponding to the plurality of time periods remaining until the scheduled future date of April 5. A four-day data processing yield amount may be calculated for a pull transfer initiation date of April 1, based on the accumulated data transfer amount of April 1, the time period of four days remaining until the scheduled future date, and the rate of return. A three-day data processing yield amount may be calculated for a pull transfer initiation date of April 2, based on the projected accumulated data transfer amount of April 2, the time period of three days remaining from April 2 until the scheduled future date, and the rate of return. A two-day data processing yield amount may be calculated for a pull transfer initiation date of April 3, based on the projected accumulated data transfer amount of April 3, the time period of two days remaining from April 3 until the scheduled future date, and the rate of return. A one-day data processing yield amount may be calculated for a pull transfer initiation date of April 4, based on the projected accumulated data transfer amount of April 4, the time period of one day remaining from April 4 until the scheduled future date, and the rate of return.

In this example, the four-day, three-day, two-day and one-day data processing yield amounts may be compared, and the greatest yield amount may be determined.

In some embodiments, a data processing yield amount may be calculated for a plurality of investments. For example, first data processing yield amount may be calculated based on the accumulated data transfer amount of the current date, the time period remaining until the scheduled future date, and the rate of return of a first investment. A second data processing yield amount may be calculated based on the accumulated data transfer amount of the current date, the time period remaining until the scheduled future date, and the rate of return of a second investment. A third data processing yield amount may be calculated based on the accumulated data transfer amount of the current date, the time period remaining until the scheduled future date, and the rate of return of a third investment. In this way, data processing yield amounts may be determined for a plurality of investments.

In some embodiments, using a combination of the methods described above, the first database management system may determine a plurality of yield amounts corresponding to a plurality of dates and a plurality of investments.

Where a plurality of data processing yield amounts has been determined, the first database management system may identify the data processing yield amount having the greatest value. In some embodiments, the first database management system may then send to a client device associated with the first entity, a notification. The notification may identify one or more of the investment, the rate of return, the pull transfer date, the corresponding accumulated data transfer amount, and the data transfer loss amount. The notification may include a selectable option to initiate a corresponding pull of the accumulated data transfer amount.

In some embodiments, the notification may include an identification of one or more data transfer options. For example, the notification may include a first data processing yield amount and a second data processing yield amount. The notification may further include an identification of one or more of the investment, the rate of return, the pull transfer date, the corresponding accumulated data transfer amount, and the data transfer loss amount associated with each of the first data processing yield amount and the second processing yield amount. The notification may still further include selectable options to initiate the pull of the accumulated data transfer amount corresponding to either the first data processing yield amount or the second data processing yield amount.

The determination of whether the overall data amount in the storage location is expected to be greater at a date on or after the scheduled future date may further consider a data processing penalty amount. As previously described, the first database management system may include records identifying various upcoming bills usually paid for using some or all of the quantity of exploitable resources associated with the entity. These records may include the amount, due date and late fees associated with each of these upcoming bills. As a result, the first database management system may determine that an upcoming bill will become due before the scheduled future date of the next transfer, and may further determine that there is presently an insufficient amount of exploitable resources available to pay the bill. As a result, the first database management system may determine that a data processing penalty amount, e.g., a late fee may be applied in connection with the bill if the bill is not paid until on or after the future scheduled date.

The first database management system may further determine that the data processing penalty amount will be avoided if a pull transfer of the accumulated data transfer amount is performed before the scheduled due date. The first database management system may further determine that the data processing penalty amount is greater than the data transfer loss amount.

In some embodiments, the first database management system may then send to a client device associated with the first entity, a notification. The notification may identify one or more of the data processing penalty amount, the amount and type of the associated bill, the accumulated data transfer amount, and the data transfer loss amount. The notification may specify that the data processing penalty amount is greater than the data transfer loss amount. The notification may include a selectable option to initiate a corresponding pull of the accumulated data transfer amount.

At operation 506, when the overall data amount in the storage location is expected to be greater at the scheduled future date if the pull transfer of the accumulated data transfer amount is performed, the first database management system initiates a pull transfer of the accumulated data transfer amount.

In some embodiments, the pull transfer of the accumulated data transfer amount may be performed subsequent to receiving, from a client device associated with the first entity, instructions to initiate the pull transfer of the accumulated data transfer amount. Alternatively, in some embodiments, the pull transfer of the accumulated data transfer amount may be performed by the first database managements system automatically.

Figure 6:
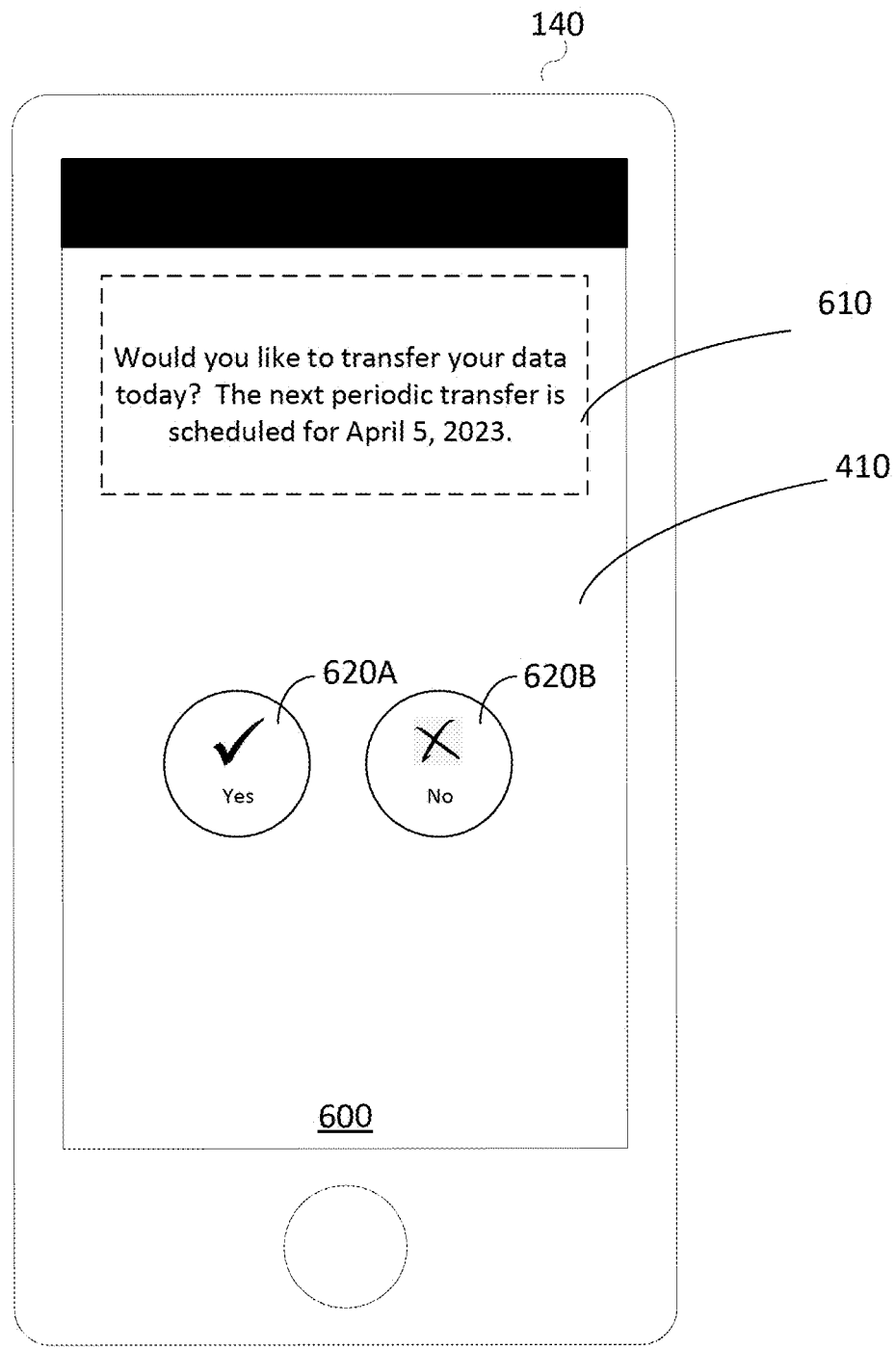
FIG. 6 shows a user interface, in accordance with an embodiment of the present application.

FIG. 6 shows a user interface for use in presenting a notification including a selectable option to initiate the pull transfer of an accumulated data transfer amount.

As illustrated, the display 410 of the client device 140 may present an example user interface 600. The example user interface 600 includes a prompt 610 and a set of response buttons 620A-620B.

The prompt 610 includes text such as may correspond to the determination at the operation 504. In the example illustrated in FIG. 6, the text recites, "Would you like to transfer your data today? The next periodic transfer is scheduled for Apr. 5, 2023." In some embodiments, reasoning related to one or more of a data transfer loss amount, a first data processing yield amount, a second data processing yield amount and/or a penalty amount may be provided.

Response button 620A is labeled "Yes" corresponds to an agreement to an offer to initiate a pull transfer of accumulated data transfer amount. Response button 620B is labeled "No" corresponds to a rejection of an offer to initiate a pull transfer of the accumulated data transfer amount.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
   a communications module;
   a processor coupled to the communications module; and
   a memory coupled to the processor, the memory storing processor-executable instructions which, when executed, configure the processor to:
   determine an accumulated data transfer amount for a periodic data transfer scheduled to be pushed at a future date;
   determine whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and
   when the overall data amount in the storage location is expected to be greater at the scheduled future date if the pull transfer of the accumulated data transfer amount is performed, initiate a pull transfer of the accumulated data transfer amount.

2. The system of claim 1, wherein the processor is further configured to:
   prior to determining whether an overall data amount in a storage location is expected to be greater at a date on or after the scheduled future date, determine that the accumulated data transfer amount exceeds a threshold amount.

3. The system of claim 1, wherein the determination of whether the overall data amount is expected to be greater considers one or more of:
   a data transfer loss amount associated with the pull transfer; and
   a first data processing yield amount associated with the accumulated data transfer amount.

4. The system of claim 3, wherein the first data processing yield amount is based on the accumulated data transfer amount and a time period between the initiation of the pull transfer of the accumulated data transfer amount and the scheduled future date.

5. The system of claim 3, wherein determining that the overall data amount in a storage location is to be expected to be greater at a date on or after the scheduled future date includes determining that the first data processing yield amount is greater than the data transfer loss amount.

6. The system of claim 3, wherein the determination of whether the overall data amount is expected to be greater further considers a data processing penalty amount, and wherein the data processing penalty amount is avoided if a pull transfer of the accumulated data transfer amount is performed before the scheduled future date.

7. The system of claim 3, wherein an entity is associated with the accumulated data transfer amount, and wherein the processor is further configured to:
   prior to initiating a pull transfer of the accumulated data transfer amount, provide, to a client device associated with the entity, a notification; and
   receive, from the client device associated with the entity, instructions to initiate the pull transfer of the accumulated data transfer amount.

8. The system of claim 7, wherein the determination of whether the overall data amount is expected to be greater at a date on or after the scheduled future date further considers a second data processing yield amount associated with the accumulated data transfer amount, and wherein the notification includes the first and second data processing yield amounts.

9. The system of claim 7, wherein the notification includes a selectable option to initiate the pull transfer of the accumulated data transfer amount.

10. The system of claim 9, wherein determining that the overall data amount in a storage location is to be expected to be greater at a date on or after the scheduled future date includes determining that the data processing penalty amount is greater than the data transfer loss amount.

11. A method comprising:
    determining an accumulated data transfer amount for a periodic data transfer scheduled to be pushed at a future date;

determining whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and when the overall data amount in the storage location is expected to be greater at the scheduled future date if the pull transfer of the accumulated data transfer amount is performed, initiating a pull transfer of the accumulated data transfer amount.

12. The method of claim 11, further comprising:
prior to determining whether an overall data amount in a storage location is expected to be greater at a date on or after the scheduled future date, determining that the accumulated data transfer amount exceeds a threshold amount.

13. The method of claim 11, wherein determining whether the overall data amount is expected to be greater considers one or more of:
a data transfer loss amount associated with the pull transfer; and
a first data processing yield amount associated with the accumulated data transfer amount.

14. The method of claim 13, wherein the first data processing yield amount is based on the accumulated data transfer amount and a time period between the initiation of the pull transfer of the accumulated data transfer amount and the scheduled future date.

15. The method of claim 13, wherein determining that the overall data amount in a storage location is to be expected to be greater at a date on or after the scheduled future date includes determining that the first data processing yield amount is greater than the data transfer loss amount.

16. The method of claim 13, wherein determining whether the overall data amount is expected to be greater further considers a data processing penalty amount, and wherein the data processing penalty amount is avoided if a pull transfer of the accumulated data transfer amount is performed before the scheduled future date.

17. The method of claim 13, wherein an entity is associated with the accumulated data transfer amount, and wherein method further comprises:
prior to initiating a pull transfer of the accumulated data transfer amount, providing, to a client device associated with the entity, a notification; and
receiving, from the client device associated with the entity, instructions to initiate the pull transfer of the accumulated data transfer amount.

18. The method of claim 17, wherein the notification includes a selectable option to initiate the pull transfer of the accumulated data transfer amount.

19. The method of claim 18, wherein determining that the overall data amount in a storage location is to be expected to be greater at a date on or after the scheduled future date includes determining that the data processing penalty amount is greater than the data transfer loss amount.

20. A non-transitory computer-readable storage medium comprising processor-executable instructions which, when executed, configure a processor to:
determine an accumulated data transfer amount for a periodic data transfer scheduled to be pushed at a future date;
determine whether an overall data amount in a storage location is expected to be greater at a date on or after the scheduled future date if a pull transfer of the accumulated data transfer amount is performed before the scheduled future date than if a pull transfer is not performed and the accumulated data transfer amount is pushed at the scheduled future date; and
when the overall data amount in the storage location is expected to be greater at the scheduled future date if the pull transfer of the accumulated data transfer amount is performed, initiate a pull transfer of the accumulated data transfer amount.

\* \* \* \* \*